United States Patent
Horng

(10) Patent No.: US 6,362,551 B1
(45) Date of Patent: Mar. 26, 2002

(54) MOTOR ROTOR AND ITS MANUFACTURING METHOD

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/472,789

(22) Filed: Dec. 28, 1999

(51) Int. Cl.[7] .................. H02K 15/00; H02K 1/04; H02K 7/00; H02K 21/12; H02K 1/22
(52) U.S. Cl. .............. 310/156.21; 310/156.12; 310/261; 310/42; 310/43; 310/67 R
(58) Field of Search .................. 310/267, 261, 310/153, 152, 42, 156.08–156.31, 43, 67 R

(56) References Cited

U.S. PATENT DOCUMENTS

| | | | | |
|---|---|---|---|---|
| 3,663,850 A | * | 5/1972 | Phelon | 310/153 |
| 3,974,817 A | * | 8/1976 | Henderson et al. | 123/149 C |
| 4,137,884 A | * | 2/1979 | Odazima et al. | 123/149 D |
| 4,423,345 A | * | 12/1983 | Nilsson | 310/153 |
| 5,128,819 A | * | 7/1992 | Elsaesser et al. | 360/99.08 |

FOREIGN PATENT DOCUMENTS

| | | | | |
|---|---|---|---|---|
| JP | 362163548 A | * | 7/1987 | |
| JP | 03049543 A | * | 3/1991 | |
| JP | 408126282 A | * | 5/1996 | |
| JP | 10327550 A | * | 12/1998 | |
| TW | 341291 | | 9/1998 | |

* cited by examiner

Primary Examiner—Nestor Ramirez
Assistant Examiner—Guillermo Perez
(74) Attorney, Agent, or Firm—Bacon & Thomas

(57) ABSTRACT

A motor rotor and a method for making the motor rotor are disclosed. A rotor casing and a central shaft of the rotor are integrally formed. The central shaft is in a central position of the rotor casing. A metal ring formed by bending a strip of metal plate is mounted to and exerts a radially expanding force to a circular inner periphery of the rotor casing. A permanent magnet ring is securely attached to a circular inner periphery of the metal ring, thereby forming a rotor.

7 Claims, 5 Drawing Sheets

MOTOR ROTOR AND ITS MANUFACTURING METHOD

BACKGROUND OF THE INVENTION

1. Field of the Invention

The present invention relates to a motor rotor and a method for making the motor rotor such that the rotor can be manufactured at a faster speed and that the rotor may rotate stably.

2. Description of the Related Art

Taiwan Utility Model Publication No. 341291 issued on Sep. 21, 1998 and entitled "ROTOR STRUCTURE FOR A FAN MOTOR" discloses a rotor that is made from plastic material by injection molding. For magnetic circuit requirement an integrally formed metal ring is provided on an inner periphery of the rotor and a magnet ring is fixed to an inner periphery of the metal ring. Since the metal ring is integrally formed with the rotor, the metal ring must be put into the mold for forming the rotor. In addition, the rotor must be formed with a central shaft at the same time. Thus, embedding of the metal ring and centering of the central shaft may slow down the overall formation speed of the rotor. In addition, in order to securely engage the metal ring with the rotor and to improve the strength of the metal ring to avoid deformation, the cross section of the metal ring must be in the form of an inverted L-shape with a flange on top side, yet this requires several punching steps and thus results in an increase in the cost for processing and material waste.

SUMMARY OF THE INVENTION

It is a primary object of the present invention to provide a motor rotor and a method for making the motor rotor such that the rotor can be manufactured at a faster speed and with a lower cost.

In accordance with the present invention, a rotor casing and a central shaft of the rotor are integrally formed by injection molding. A metal ring is mounted to a circular inner periphery of the rotor casing. The metal ring is formed by means of bending a strip of metal plate that has a length equal to or slightly smaller than an inner circumference of the rotor casing. Thus, the metal ring has certain resiliency to exert a radially outward force to the inner periphery of the rotor casing. In addition, two ends of the metal ring may contact with each other or have a gap therebetween. A permanent magnet ring is tightly fitted onto a circular inner periphery of the metal ring mounted in the rotor casing.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

The present invention will be explained below with reference to the accompanying drawings.

Figure 1:
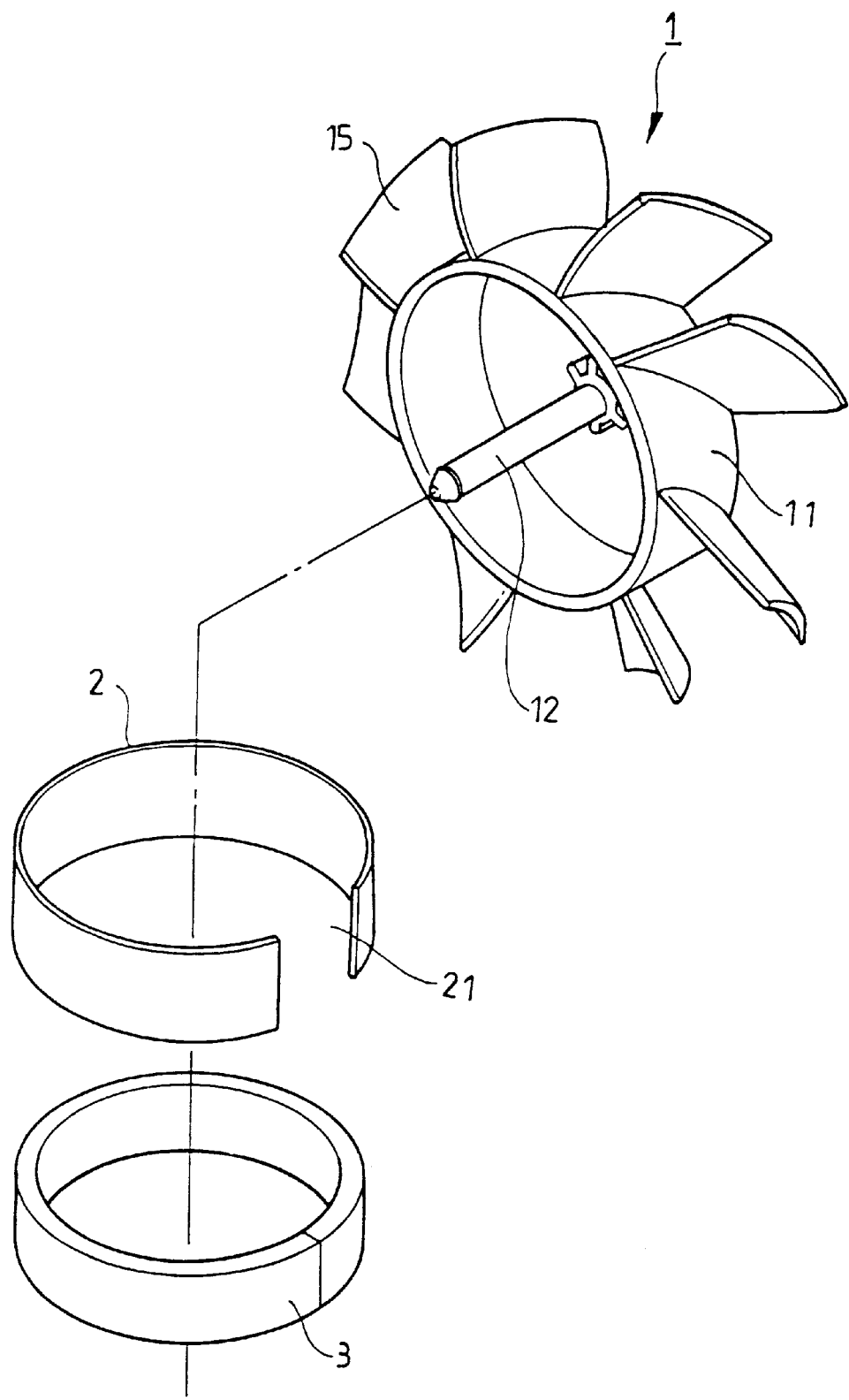
FIG. 1 is an exploded perspective view of a first embodiment of a motor rotor in accordance with the present invention.

Referring to FIG. 1, a motor rotor in accordance with the present invention includes a rotor casing 1, a metal ring 2, and a magnet ring 3.

The rotor casing 1 is made of plastic material by injection molding. The rotor casing 1 may be in the form of an impeller with blades 15 and has a peripheral wall 11 as well as an integrally formed central shaft 12 such that the rotor casing 1 may rotate about its central shaft 12.

The metal ring 2 is formed by means of bending a strip of metal plate that has a length equal to or slightly smaller than an inner circumference of the peripheral wall 11 of the rotor casing 1. The metal ring 2 thus formed has two ends in contact with each other or have a gap 21 therebetween. Thus, the metal ring 2 has certain resiliency and thus exerts a radially outward force when the two ends of the metal ring 2 are compressed and thus forced to approach each other.

The magnet ring 3 is made of a strip of plastic magnet, rubber magnet, etc. The magnet ring 3 is circular with two ends in jointed with each other. A junction between the two ends of the magnet ring 3 may not be in alignment with the gap 21 of the metal ring 2. In addition, an outer diameter of the ring magnet 3 is slightly smaller than an inner diameter of the rotor casing 1.

Figure 2:
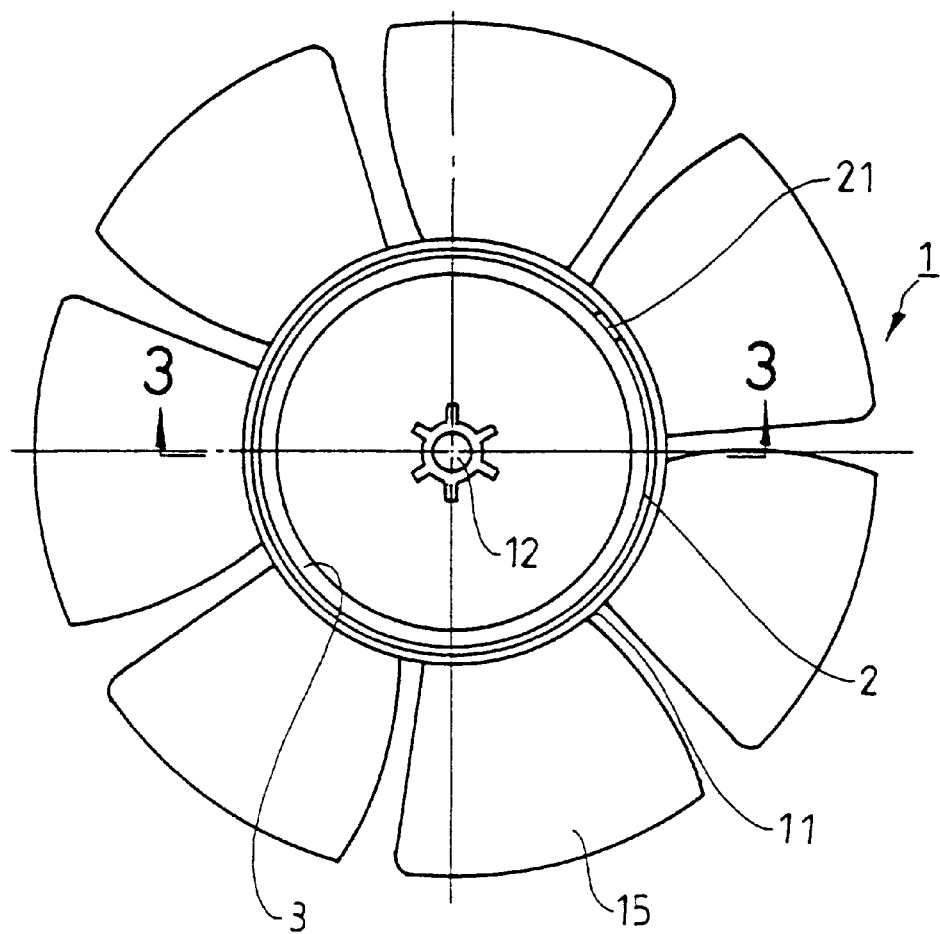
FIG. 2 is a bottom view of the motor rotor in FIG. 1.
Figure 3:
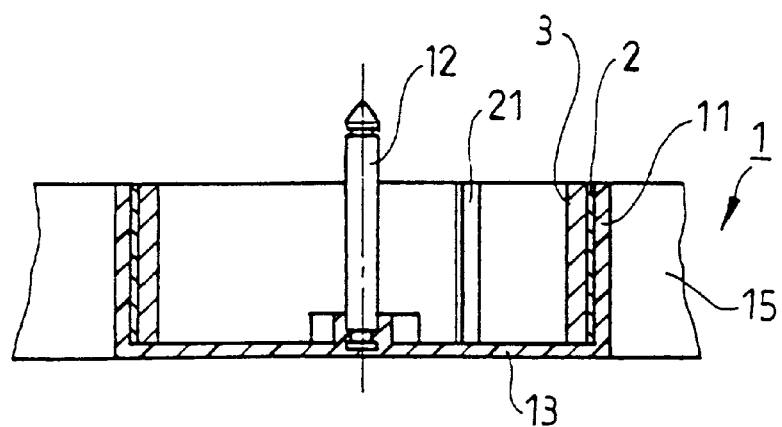
FIG. 3 is a sectional view taken along line 3—3 in FIG. 2.

The method for manufacturing the rotor motor will now be described with reference to FIGS. 2 and 3. First, the metal ring 2 formed from a strip of metal plate is mounted to an inner periphery of the peripheral wall 11 of the rotor casing 1 having a central shaft 12. The metal ring 2 has certain resiliency to exert a radially outward force so as to be in tight contact with the inner periphery of the peripheral wall 11. The metal ring 2 has a length equal to or slightly smaller than an inner circumference of the peripheral wall 11 of the rotor casing 1 such that two ends of the metal ring 2 are in contact with each other or have a gap 21 therebetween.

Next, a magnet ring 3 having an outer diameter slightly smaller than an inner diameter of the peripheral wall 11 of the rotor casing 1 are tightly fitted onto an inner periphery of the metal ring. A junction interface between the metal ring 2 and the magnet ring 3 may be applied with adhesive. Finally, the rotor is subjected to balance adjustment test to assure stable rotation of the rotor about its central shaft 12.

Figure 4:
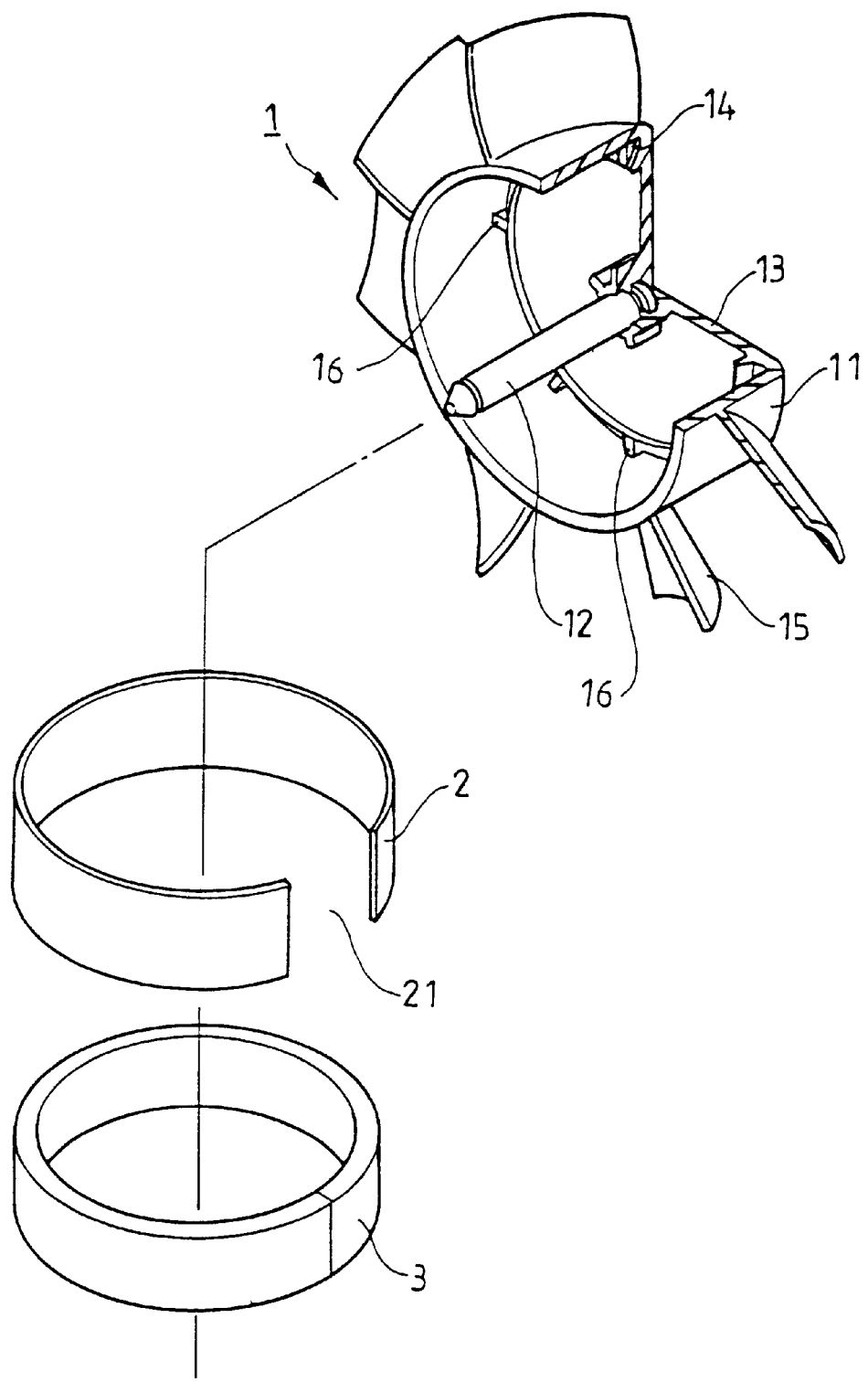
FIG. 4 is an exploded perspective view of a second embodiment of the motor rotor in accordance with the present invention.
Figure 5:
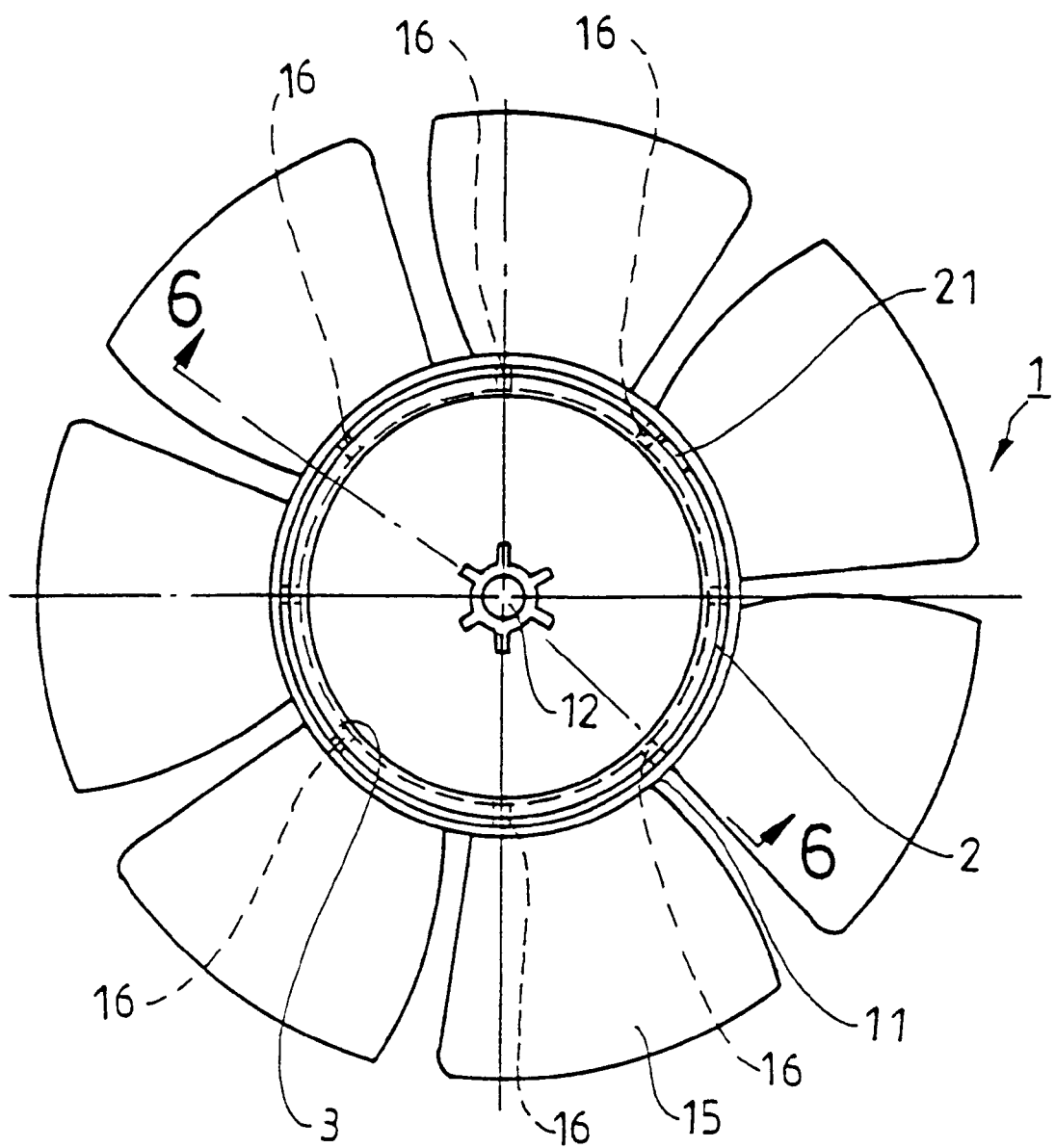
FIG. 5 is a bottom view of the motor rotor in FIG. 4.
Figure 6:
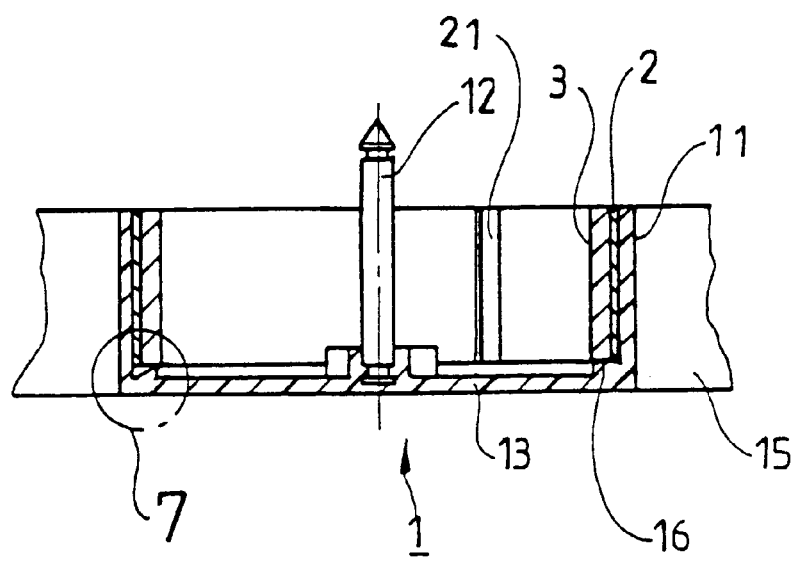
FIG. 6 is a sectional view taken along line 6—6 in FIG. 5.
Figure 7:
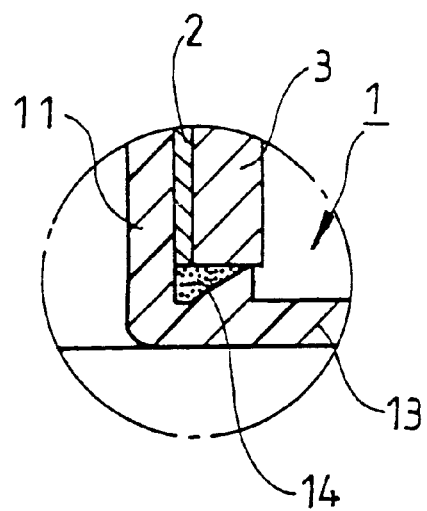
FIG. 7 is an enlarged view of a circle in FIG. 6.

FIGS. 4 through 6 illustrate a second embodiment of the rotor motor in accordance with the present invention. In this embodiment, a junction area between the peripheral wall 11 and a top of the rotor casing 1 has an annular groove 14 separated by a plurality of blocks or ribs 16 (FIG. 5), thereby forming a plurality of independent grooves. As illustrated in FIG. 6, the ribs 16 provide a support for the metal ring 2 and the magnet ring 3, thereby preventing the metal ring 2 and the magnet ring 3 from falling into the groove 14. Adhesive (not labeled, see FIG. 7) may be filled in the groove 14 to provide bonding between the metal ring 2 and the magnet ring 3. Thus, the rotor casing 1, the metal ring 2, and the magnet ring 3 may be bonded more firmly together.

With the motor rotor and the method for manufacturing the motor rotor in accordance with the present invention, it is appreciated that manufacture of the rotor is simple without material waste, as the metal ring is formed by means of bending a strip of metal plate. The metal ring 2 is tightly contact with rotor casing by its radial expanding force toward the inner periphery of peripheral wall. Therefore, the injection of molding for the rotor casing becomes simple. After finishing the manufacturing, the rotor is finally subjected to balance test to ensure the rotation of rotor is more stable. Thus, the central shaft and a bearing therefor may rotate in a smooth manner, thereby reducing malfunction possibility and increasing operation life.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A motor rotor comprising:

a rotor casing made of plastic material by injection molding and having a peripheral wall with a central shaft at a center thereof, a top of the rotor casing having an annular groove for receiving adhesive and a plurality of ribs separating the annular groove into independent grooves;

a metal ring formed by means of bending a strip of metal plate, the metal ring including two ends that have a gap therebetween, the metal ring having resiliency to exert a radially expanding force to and thus being in tight contract with an inner periphery of the peripheral wall of the casing, the ribs supporting the metal ring, thereby preventing it falling into the groove; and a magnet ring mounted to an inner periphery of the metal ring, the ribs supporting the magnet ring, thereby preventing it falling into the groove.

2. The motor rotor as claimed in claim 1, wherein the strip of metal plate forming the metal ring has a length equal to or slightly smaller than an inner circumference of the peripheral wall of the rotor casing.

3. The motor rotor as claimed in claim 1, wherein the magnet ring has an outer diameter slightly smaller than an inner diameter of the peripheral wall of the rotor casing.

4. The motor rotor as claimed in claim 1, wherein the rotor casing has a plurality of blades on an outer periphery thereof.

5. The motor rotor as claimed in claim 1, wherein the rotor casing has a top surface, the top surface and the peripheral wall of the rotor casing forming a groove in a junction area therebetween.

6. The motor rotor as claimed in claim 5, wherein the groove receives adhesive therein for bonding the magnet ring and the metal ring together.

7. The motor rotor as claimed in claim 1, wherein the magnet ring and the metal ring are bonded by adhesive.

* * * * *